(12) United States Patent
Waggoner et al.

(10) Patent No.: US 7,351,296 B2
(45) Date of Patent: Apr. 1, 2008

(54) STRETCHABLE FLASHING MATERIALS AND PROCESSES FOR MAKING

(75) Inventors: James Ross Waggoner, Midlothian, VA (US); James S. Herrin, Jr., Newark, DE (US); Theresa Ann Weston, Richmond, VA (US); Mieczyslaw (Michel) Stachnik, Luxembourg (LU)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/591,820

(22) Filed: Nov. 2, 2006

(65) Prior Publication Data

US 2007/0051463 A1    Mar. 8, 2007

Related U.S. Application Data

(62) Division of application No. 10/257,586, filed as application No. PCT/US01/13383 on Apr. 25, 2001.

(60) Provisional application No. 60/199,436, filed on Apr. 25, 2000.

(51) Int. Cl.
*E04F 13/00* (2006.01)

(52) U.S. Cl. ............... 156/71; 52/745.05; 52/745.15; 52/209

(58) Field of Classification Search ............... 156/71, 156/250, 253, 256; 52/58–62, 204.1, 204.5, 52/97, 302.6, 741.4, 745.15, 209, 745.05
See application file for complete search history.

(56) References Cited

U.S. PATENT DOCUMENTS 5,899,026 A * 5/1999 Williams et al. ............... 52/58
6,725,610 B2 * 4/2004 Murphy et al. ............... 52/58

OTHER PUBLICATIONS

Journal of Light Construction, Patricia McDaniel, Wrapping The House: Do's and Don't, Mar. 2000.*

* cited by examiner

*Primary Examiner*—Philip Tucker
*Assistant Examiner*—Sing P. Chan

(57) ABSTRACT

Stretchable material with recovery properties that are waterproof and conformable in two or three dimensions particularly adapted for flashing in structures, especially at the bottom and lower corners of openings where water is likely to collect. A method of installing flashing materials in openings in structures.

11 Claims, 6 Drawing Sheets

STRETCHABLE FLASHING MATERIALS AND PROCESSES FOR MAKING

BACKGROUND OF THE INVENTION

1. Field of the Invention

This invention is directed to stretchable materials suitable for use in flashing applications to prevent water intrusion through openings in building structures such as windows and doors, and to a method for installing such materials.

2. Description of the Related Art

Materials that are installed in openings in building structures to provide protection from water intrusion are known as flashing. Flashing materials are available as both rigid and flexible materials. Rigid flashing materials are often preformed and then installed at the construction site. Sometimes the rigid flashing is formed on site. Rigid flashing does not adapt well to variances in the building structure and often must rely on auxiliary caulking, sealing, or taping to provide a barrier to water intrusion. Flexible flashing materials, sometimes referred to as flashing tapes or papers, provide protection by covering building framing and sheathing. Flexible flashing materials rely on the underlying building framing for primary structural support. Some current methods for flashing windows or other openings with flexible flashing materials typically involve cutting to size and piecing several flashing members and partially overlapping to seal the opening prior to inserting the window into the window opening. Such methods require time and skill to make a good fit in the building opening. These conventional types of flashing lack adaptability for use in openings that are round or of some other non-standard shape and therefore can result in breaches at seams and overlaps leading to water intrusion. As such there is a need for a flashing material that can be used on-site that requires relatively little skill, is adaptable to various shapes of openings and also provides excellent water hold-out properties. Additionally, because such a flashing material provides improved protection to the underlying building framing, a method of window installation that allows for drainage of incidental water, which may enter through the face of the window (for example at mullion joints) can be used, thus offering additional protection against building moisture damage.

BRIEF DESCRIPTION OF THE DRAWINGS

FIG. 8b is a schematic top view of a flattened pleat structure in FIG. 8a.

DETAILED DESCRIPTION OF THE INVENTION

Figure 1:
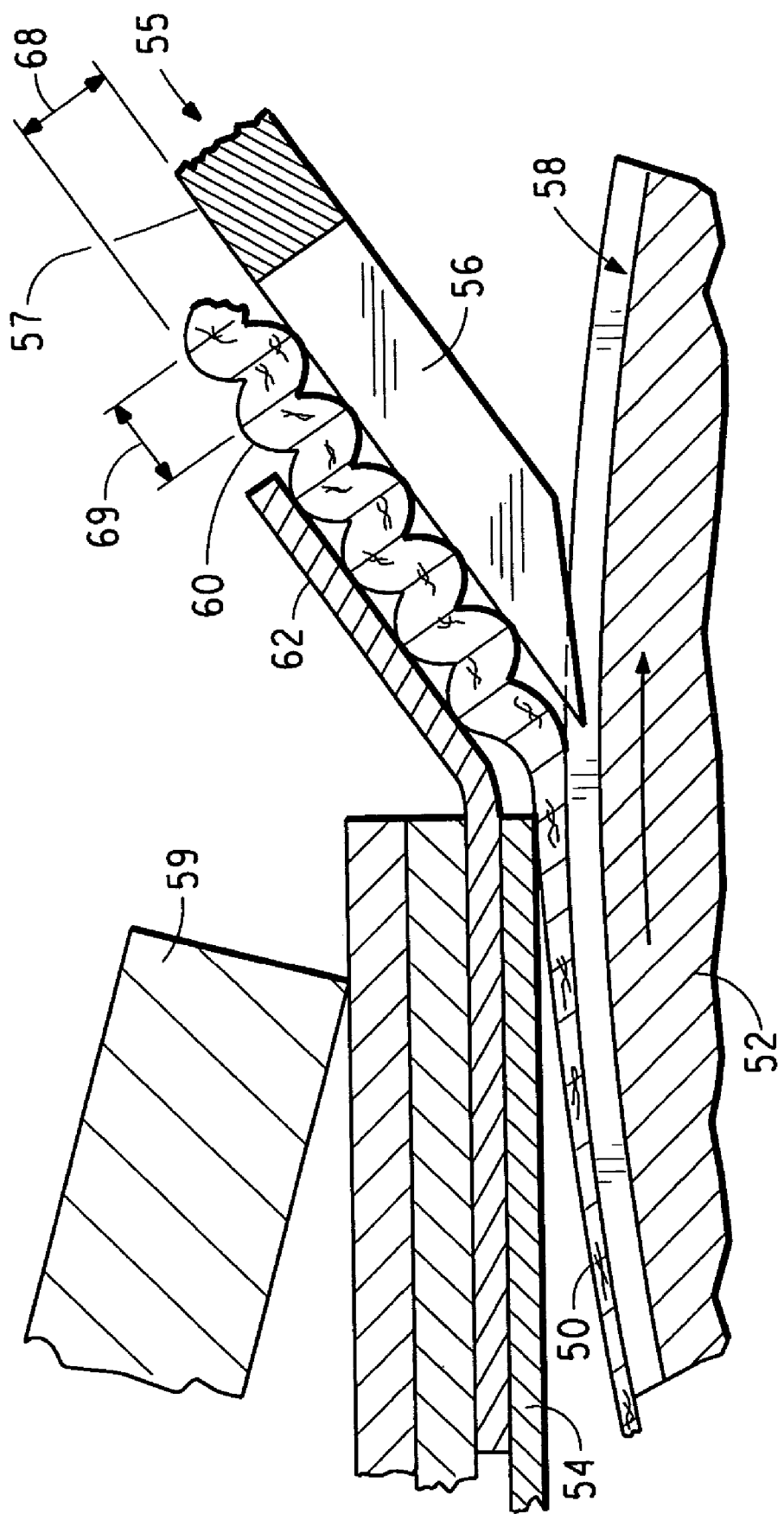
FIG. 1 is a side view of an apparatus for creping a sheet of material.

The flashing method and material of the current invention allows a single piece of flashing to wrap the complex, multi-surface, two- or three-dimensional shape at the bottom and sides of an opening in a building, such as an opening for a window, door, chimney, electrical connection or piping. The flashing material has stretch recoverable properties that allows it to be installed covering the interior of the rough opening (particularly the bottom sill and comers) and then stretched and folded to the outside face of the framing and/or sheathing of the comers of the window, thereby forming seamless three-dimensional covering of the rough opening comers of the window. Although the term "window" may be used at times in this disclosure it is generally understood that it is meant to include openings in buildings where flashing would be useful to prevent intrusion of water.

The flashing material is an elastic, conformable, flexible water resistant sheet. The flashing material can also be an elastic, conformable, flexible, water-resistant gathered laminate. Preferably, the flashing material is gathered by means such as by elastomeric strands or by pleating. The gathering of the laminate can also be achieved by providing an elastic sheet whether woven or nonwoven or an elastic net sandwiched between the first and second layers. Also, the flashing material can be gathered by stitch-bonding with an elastomeric material. In a preferred embodiment, the flashing is stretch recoverable so that if it is stretched too much during installation, it will retract to form a good fit with the window section rather than leaving excess material which would buckle, etc. on the surface and allow the possibility for water intrusion as could be noticed by pooling or otherwise collecting.

In another aspect, the current invention also relates to a method for flashing window and door openings using a stretch recoverable flashing material. This method of window flashing includes the seamless, 3-dimensional coverage of the bottom comers and sill of the window rough opening, and sealing of the window to the rough opening so as to create the a path for drainage of incidental water. This is accomplished by not sealing the bottom comers and sill with caulk or some other appropriate sealing. The coverage of the rough opening extends partially or fully up the rough opening jambs. The drainage is provided by the combination of having the bottom and jambs (sides) of the rough opening covered by the flashing material and not applying sealant to those locations.

In one embodiment, the current invention comprises a stretch-recoverable laminate for use as a flashing material comprising an array of elastomeric strands sandwiched between first and second layers of sheet material. The laminate is assembled with the elastomeric strands under tension in an elongated state and the layers are bonded using a hot melt adhesive. After lamination, the tension on the elastomeric strands is removed and the recovery force of the elastomeric strands results in gathering of the laminate. Preferably the laminate has an elongation of between 100 and 200% and a stretch recovery of at least 90% where stretch recovery is measured as $$(\text{extended length} - \text{recovered length})/(\text{extended length} - \text{original length}) * 100.$$

The first layer comprises a non-woven fabric or a film and provides toughness and durability required to prevent tearing of the laminate when it is installed around sharp edges, etc. of a building and a compatible surface for integration with other building materials (e.g., caulks and sealants). The first layer forms the outer surface of the flashing material, that is, the surface that is away from the building when installed. The laminate should exhibit minimum surface fuzzing and should have high resistance to delamination upon handling during installation. The first layer can be breathable (vapor permeable) or non-breathable (non vapor permeable) and should have sufficient water hold-out capability to prevent water from contacting the adhesive layer. Preferably the first layer is a nonwoven layer having a hydrostatic head (hydrohead) value of at least 10 inches (25.4 cm), more preferably at least 40 inches (101.6 cm). In cases where the initial bond strength of the adhesive layer is increased in the presence of moisture, it may be desirable for the first layer to be breathable, for example a perforated film or breathable non-woven. The first layer should have a structure that is sufficiently closed (impermeable) to contain the hot melt adhesive so that the adhesive does not extend through the layer to the outer surface of the laminate. Examples of non-woven layers suitable for use in the first layer include spun-bonded olefin sheets such as spun-bonded polypropylene and polyethylene sheets. Also, polyester, nylon or bicomponents of polyethylene/polypropylene, polyethylene/polyester and polypropylene/polyester can be used. The first layer may be topically treated or coated with an extruded film or layer of coated lacquer in order to improve the water resistance, to improve compatibility with auxiliary caulks and sealants or to enhance ink acceptance during printing, if desired.

In one embodiment, the first layer is an embossed, creped flash-spun high density polyethylene sheet having a basis weight of 0.6-3.0 oz/yd$^2$ (20.3-102 g/m$^2$). Preferably, the sheet has a basis weight of 1.2-1.4 oz/yd$^2$ (40-48 g/m$^2$). An example of such a sheet is Tyvek® flash spun polyethylene manufactured by E.I. du Pont de Nemours and Company, Wilmington, Del. (DuPont). The preparation of flash-spun non-woven plexifilamentary film-fibril sheets is described in Steuber, U.S. Pat. No. 3,169,899, which is hereby incorporated by reference. The sheet may be bonded and embossed using a thermal calender bonder such as that described in U.S. Pat. No. 5,972,147, which is hereby incorporated by reference. The use of the thermal canender bonder step provides a non-woven sheet with high delamination strength. The non-woven sheet preferably has a delamination strength of at least 0.08 lb-inch (0.9 N-cm), and more preferably has a delamination strength of at least 0.25 lb-inch (2.8 N-cm). Alternatively, the sheet may be bonded and embossed using a point bonder which provides low bonded areas in the sheet making it more conformable and more easily gathered by the elastomeric strands in the final laminate. Methods for point bonding and softening flash-spun sheets are described in Dempsey, U.S. Pat. No. 3,427,376 and Dempsey et al, U.S. Pat. No. 3,478,141, each of which is hereby incorporated by reference. The creping step softens the flash-spun sheet to render it sufficiently flexible to be gathered by the elastomeric strands in the final laminate; this step may not be necessary if the point bonder is used in the bonding step.

A preferred method for creping a flat spun-bonded fibrous sheet is shown in FIG. 1 and is fully described in U.S. Pat. No. 4,090,385, which is hereby incorporated by reference. According to this method, a flat sheet 50 is fed from a supply roll (not shown) to a main roll 52 having either a flat surface or a grooved surface. A primary surface 54 presses the flat sheet 50 against the main roll 52. The main roll is preferably maintained at a temperature of between 100 and 120 degrees F. A pressure plate 59 applies a constant pressure to the flat sheet 50. A creping blade is positioned in front of the path of the flat sheet. A flat creping blade is used with a flat roll and a combed blade is used with a grooved roll. As shown in FIG. 1, where the creping blade 55 is combed, each tooth 56 on the comb 57 has a tip that extends into one of the grooves 58 on the surface of the main roll 52.

After the flat sheet 50 passes the end of the primary surface 54, the sheet runs into the teeth of the comb 57 which slow the sheet 50 down and cause the sheet to bunch up and form a wavy grooved sheet 60. The amplitude of the waves (crest to trough) and the length of the waves in the wavy grooved sheet 60 are initially determined by the amount of space between the surface of the main roll 52 and a flexible retarder 62 and the space between the crepe blade 55 and the flexible retarder 62. The amplitude and length of the waves in the grooved sheet 60 is further adjusted by adjusting the speed of the take-up roll (not shown). The speed of the take-up roll is some fraction of the speed of the supply roll and the main roll 52, preferably about 50%. As the speed of the take-up roll gets closer to the speed of the supply and main rolls, the amplitude of the waves in the grooved sheet becomes smaller and the length of the waves becomes longer. The amplitude 68 of the waves in the sheet 60 is preferably between about 0.2 mm and 3.0 mm and the wave length 69 of the waves in the sheet 60 is preferably between about 2 mm and about 8 mm. Optionally, before the creped sheet is wound up, rotating rolls are used to pull out most of the crepe, so that the resulting crepe level is approximately 10%. This facilitates subsequent handling of the sheet.

The second layer can be the same as the first layer, but preferably comprises a non-breathable waterproof polymeric film. A non-woven sheet which has been coated with a waterproof layer such as a polymeric film can also be used, provided that the coated non-woven is sufficiently flexible to be gathered by the array of elastomeric strands. The polymeric film layer can comprise an elastomeric film. The second layer provides the water hold-out properties required to prevent water intrusion. It is particularly important that water intrusion be prevented when exposed to soap or surfactant solutions, such as may be encountered when power washing the exterior of a building. In a preferred embodiment, the second layer is a low density polyethylene or linear low density polyethylene film about 1.1 to 2.0 mils (0.03 to 0.05 mm) thick. More preferably the film has a thickness of about 1.1 to 1.5 mils (0.03 to 0.04 mm). Other polymeric films useful as the second layer include ethylene vinyl acetate, high density polyethylene, ethylene alpha-olefin copolymers such as Engage® copolymers available from DuPont Dow Elastomers, styrene-butadiene-styrene (SBS), styrene-isoprene-styrene (SIS) block copolymers such as Kraton® copolymers available from Shell Chemical Company, breathable films made of Hytrel® (DuPont), Pebax® a polyester (available from ATOFINA Chemicals, Inc., Philadelphia, Pa.) or polyurethane, or microporous PTFE or polyolefin films or composites thereof. Hytrel® or Pebax® films which are breathable, puncture resistant and highly elastic are preferred as the second layer when the desired flashing material is to be breathable.

Both the first and second layers must be flexible and have sufficiently low modulus to be gathered by the recovery force of the elastomeric strands (i.e. must not be too stiff). One measure of the stiffness of a film layer is the secant modulus. Films useful in the current invention preferably have a secant modulus of less than about 40,000 psi (2800 kg/cm$^2$). A measure of the flexibility or drapability of non-woven layers is the Handle-o-meter stiffness. Non-woven sheets used in the laminate of the current invention preferably have a Handle-o-meter stiffness of less than about 160 grams (g). Both the first and second layers preferably are stable to ultraviolet light and may contain additives such as carbon black, etc. to improve their resistance to degradation by ultraviolet light.

An array of elastomeric strands is aligned in the machine direction between the first and second layers, with a spacing between the strands in the cross-direction of between 2 to 8 strands per inch (0.8 to 3.1 strands per cm), preferably 2 to 6 strands per inch (0.8 to 2.4 strands per cm). Preferably, the elastomeric strand material comprises an elastomeric fiber such as spandex. As used herein, the term "spandex" has its conventional meaning; namely, a manufactured fiber or filament in which the fiber-forming substance is a long chain synthetic polymer comprised of at least 85% of a segmented polyurethane. By "elastomeric fiber" is meant a staple fiber or continuous filament which has a break elongation in excess of 100% and which when stretched and released, retracts quickly and forcibly to substantially its original length. Such fibers include, but are not limited to, rubber fiber, spandex, polyetherester fiber, elastoester, and may be covered with other non-elastomeric fibers or may be bare (uncovered). A preferred spandex is Lycra® spandex having a linear density of 600-1300 dtex (540-1170 denier), available from DuPont. Spandex having lower linear densities can be used so long as the retractive force is sufficient to gather the laminate to form a laminate capable of an elongation of between about 100-200%, preferably between about 130% and 200%. The number and linear density of the strands is selected to give the desired properties in the final laminate. A relatively high number of strands per inch of laminate width keeps the laminate surface relatively smooth and aesthetically attractive. The spandex can have a linear density from as low as 90 dtex up to 1600 dtex (81 to 1440 denier). The number of strands can vary depending on the recovery power of the strands and/or the stiffness of the first and second layers.

Figure 2:
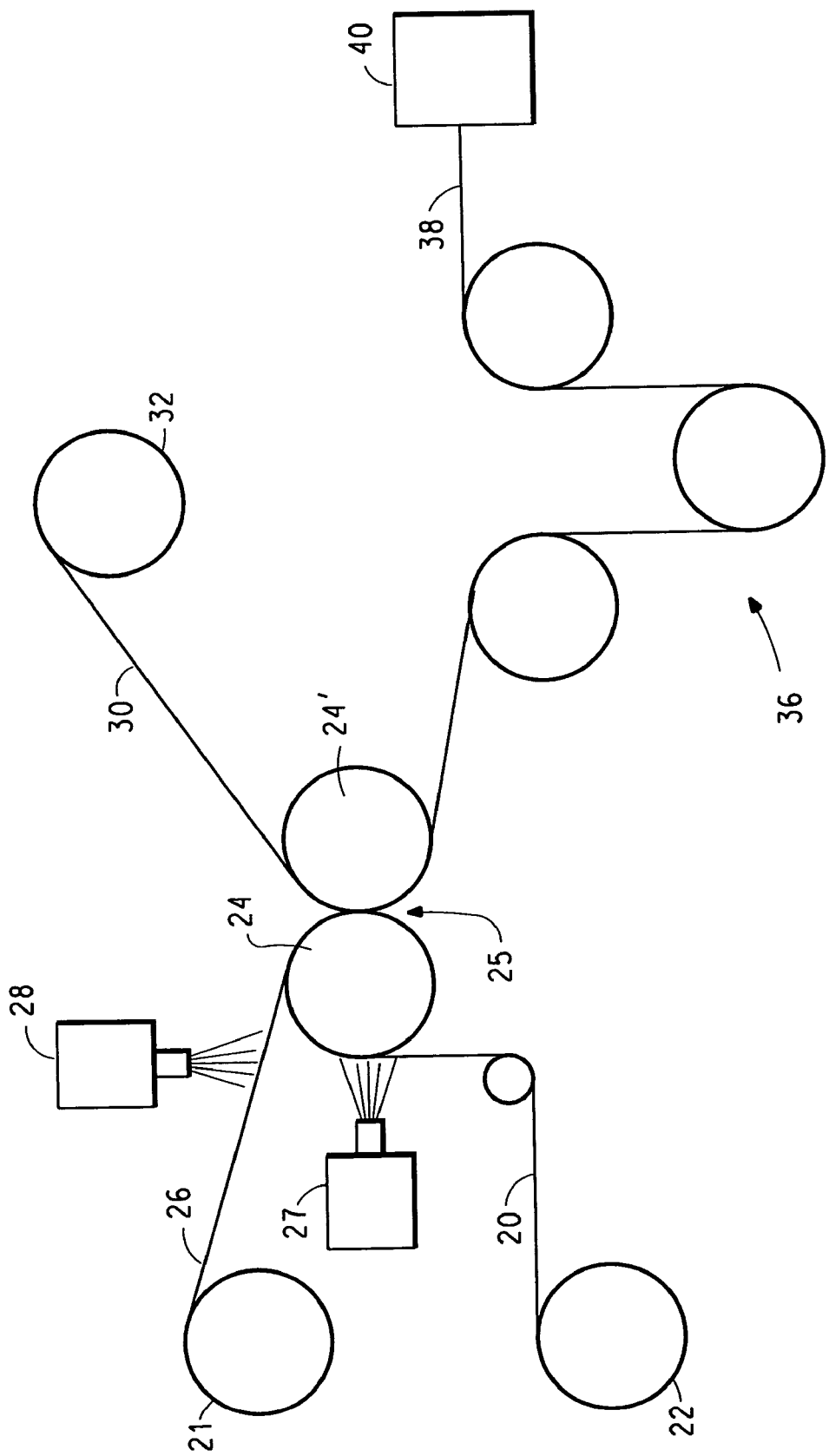
FIG. 2 is a schematic sketch of an apparatus for making the stretch laminate.

The laminate of the current invention can be manufactured by joining together the first and second layers and the array of elastomeric strand material using a high speed, e.g. 300-600 fpm (91-183 mpm), narrow width, lamination machine, as shown in FIG. 2. First sheet layer 20 is delivered from supply roll 22 and fed at a predetermined speed towards adhesive applicator 28 and nip 25 formed by nip rolls 24 and 24'. An array of elastomeric strands 26 is aligned in the machine direction and is under machine direction tension in a stretched state, preferably between about 200%-300% elongation, during the lamination process. The elastomeric strands should be stretched sufficiently to gather the first and second layers but not stretched so much that the elastomeric strands break and cause process interruptions. An adhesive, such as a hot melt adhesive, is applied using adhesive applicator 28. Examples of suitable adhesive applicators are spray and slot coaters. The hot melt adhesive can be held in a molten state in a hot reservoir and pumped therefrom through die orifices and applied to one or both of the first and second layers. In the embodiment shown in FIG. 2, the adhesive is sprayed through the array of elastomeric strands 26 and onto first layer 20. In a preferred embodiment where the first layer is a flash-spun high density polyethylene sheet and the second layer is a linear low density polyethylene film, the adhesive is preferably applied to the flash-spun high density polyethylene sheet which has better resistance to high temperatures, thus better withstanding the heat from the hot melt when it first impinges on the layer. The first sheet layer and the array of elastomeric strands are brought into contact with second layer 30, which is delivered from supply roll 32 towards roll nip 25 formed by counter-rotating nip rolls 24 and 24'. The first and second layers are forced into direct contact with the stretched elastomeric array and hot melt adhesive in the roll nip to form tensioned laminate 34 with the stretched elastomeric strands sandwiched between the first and second sheet layers. Tension is maintained on the laminate until it passes tensioning rolls 36. This allows the hot melt adhesive to cool and bond the layers together before the machine direction tension is released. After the machine direction tension is released, the elastomeric strands retract and cause a reduction in length of the laminate due to the gathering of the layers in an accordion fashion to form gathered laminate 38. The gathered laminate is fed to a collection chamber such as J-box 40 which acts as an accumulator and provides a differential in speed between the gathered laminate entering the collection chamber and the laminate exiting the chamber such that the laminate exits at a speed that is lower than the entrance speed. In order to allow the laminate to further relax, it can be collected in a festooning station 42 where the laminate is directed in a back and forth motion to form folds in a box.

It is important when the tension on the elastomeric strands is released that the hot melt adhesive has formed a strong adhesive bond between the first and second layers and the elastomeric array. Thus, it is important that the hot melt adhesive provide high initial tack to quickly provide a strong bond between the layers. Examples of suitable hot melt adhesives include styrene-isoprene-styrene adhesives. The hot melt adhesive is preferably selected such that it provides good bond strength between the layers and also has good ultraviolet and thermal stability. A combination of hot melt adhesive compositions can be used by feeding to separate orifices from different reservoirs. For example, a first adhesive component which provides high initial tack such as styrene-isoprene-styrene hot melt adhesives like those known in the art for use in diaper manufacture can be applied. This is depicted as adhesive applicator 27 in FIG. 2. This can be followed by another adhesive component supplied from a separate orifice, which provides excellent adhesion over a range of temperature extremes as well as good ultraviolet and thermal stability which is desirable for outdoor construction applications such as flashing. This is depicted as adhesive applicator 28 in FIG. 2. The order of the application of the hot melt adhesive compositions may be reversed.

In order to improve the bond between the adhesive and the first and second layers, the surface of one or both of the layers which contacts the adhesive can be treated to increase the bond strength. For example, when a hydrophobic sheet is used, such as a polyolefin sheet, the sheet can be corona treated using methods known in the art to reduce the surface tension and promote bonding with the adhesive. The corona treatment oxidizes the surface of the polyolefin sheet that results in increased affinity for hydrophilic hot melt adhesives. Alternately, one or both of the layers can comprise an embossed film or non-woven having a textured surface, such as a film which is microembossed on both surfaces, also improves bonding between the adhesive and the layers. Tyvek® flash-spun polyethylene sheet is well-suited as the first layer since it inherently has a textured surface which allows for better bond sites for the hot melt adhesives.

The final length of the untensioned laminate is preferably no more than about one-half the original length of the first and second layers. The stretch-recoverable laminate is capable of a total elongation of approximately 100 to 200%, preferably 130% to 160%. Elongation is defined as [(extended length−recovered length)/recovered length]×100%.

The elongation of the final laminate will depend on the stiffness of the first and second layers. The lower the stiffness of the first and second layers, the more the elastomeric strands are allowed to retract when the tension applied during the lamination step is released, thereby resulting in a higher degree of gathering in the final laminate (and a correspondingly higher degree of elongation).

In a preferred embodiment, the gathered laminate is heat treated in a relaxed state at a temperature that is less than the softening point of the hot melt adhesive, preferably 15 to 20° F. (−9 to −6° C.) less than the softening point of the hot melt adhesive. The laminate is heated for a time sufficient to shrink and stabilize the laminate so that it is dimensionally stable at temperatures between about −50° F. (−46° C.) and about 185° F. (85° C.), which are believed to be typical of conditions encountered in flashing end uses. Preferably, the gathered laminate is stabilized so that it shrinks less than 10% in the machine direction and less than 1% in the cross direction when cycled at the temperatures above. Many embodiments are contemplated which would not require heat stabilization, such as a laminate according to the invention in which the second layer is a Hytrel® film.

In a preferred embodiment, the laminate includes an elastomeric pressure-sensitive adhesive layer that is bonded to the outer surface of the second layer of the gathered laminate. A preferred pressure sensitive adhesive is a synthetic butyl rubber-based sealant. Building adhesives comprising asphalt and rubber can also be used, such as compositions comprised of bitumen and rubber and, optionally, additives selected from mineral oil, resin, etc. The rubber may be vulcanized or unvulcanized rubber, for example natural or synthetic rubbers such as styrene-butadiene rubber, and the like. The pressure sensitive adhesive layer should have sufficient adhesive strength to adhere the laminate to a building structure comprising materials such as wood, oriented strand board (OSB), rigid polystyrene foamboard, Tyvek® flash spun polyethylene housewrap, other plastic materials used for housewrap applications, asphalt impregnated papers, etc. The pressure-sensitive adhesive layer can be applied with full or partial coverage and is a full coverage layer about 5-60 mils (0.13-1.52 mm) thick and preferably 10-40 mils thick (0.26-1.02 mm). The pressure-sensitive adhesive layer should not be so thick that, for example, it makes it difficult for a window to fit in an opening, but it should be thick enough that when the gathered laminate is stretched during installation that the adhesive does not thin so much that tears form in the adhesive layer. Due to the compressible characteristics of the gathered laminate, it provides a "gasket effect" when installed between a window and a building surface. This may further reduce water intrusion and the need for additional caulking. The pressure-sensitive adhesive can be applied to the laminate by extruding or otherwise applying the adhesive through a narrow slot onto the outside surface of the second layer of the laminate. The outside surface is that surface opposite the surface that is contacted by the adhesive and the array of elastomeric fibers. A release paper is applied in one or more sections to cover the pressure-sensitive adhesive layer, preferably in two overlapping sections along the width of the laminate. Preferably, the laminate is not in an extended state during extrusion of the pressure-sensitive adhesive layer. In some cases, approximately 5-10% stretch can be applied to the laminate as the pressure-sensitive adhesive is extruded thereon. The pressure-sensitive adhesive preferably covers substantially the entire exposed surface of the second layer and extends to within about 1/8 inch (0.32 cm) of the edge of the laminate, preferably to the edge of the laminate. The laminate structure with the pressure-sensitive adhesive layer can be wound on cores in 50 to 75 foot (15 to 23 m) lengths and packaged. For flashing end uses, a convenient laminate width is approximately 8 to 12 inches (15.2 to 30.5 cm), preferably 8 inches. The laminate can be formed in wider widths and then cut into the desired width for flashing. For some flashing end uses, laminate widths as low as 4 inches (10 cm) are convenient.

The gathered laminate can be installed as flashing in windows and other openings without the use of a pressure-sensitive adhesive layer. In such cases, laminates having high water hold-out should be used. However, when using standard primary fasteners, such as staples, the use of a pressure-sensitive adhesive layer is preferred because it reduces the number of fastening members required to hold the flashing in place. Primary fasteners are those that are used to hold the flashing in place. Secondary fasteners are those that may inadvertently penetrate the flashing, but are used to fasten other construction materials. In addition, when the pressure-sensitive layer is being applied it flows into the valleys created by the gathered structure and further contributes to water hold-out. In some instances, such as when laminate is bent around corners when installing in an opening in a building, the recovery force of the elastomeric strands may be sufficient to pull the adhesive layer away from contact with the wood or other surface. In such cases, a small number of fasteners such as staples can be used around the outside of the corner.

Figure 3:
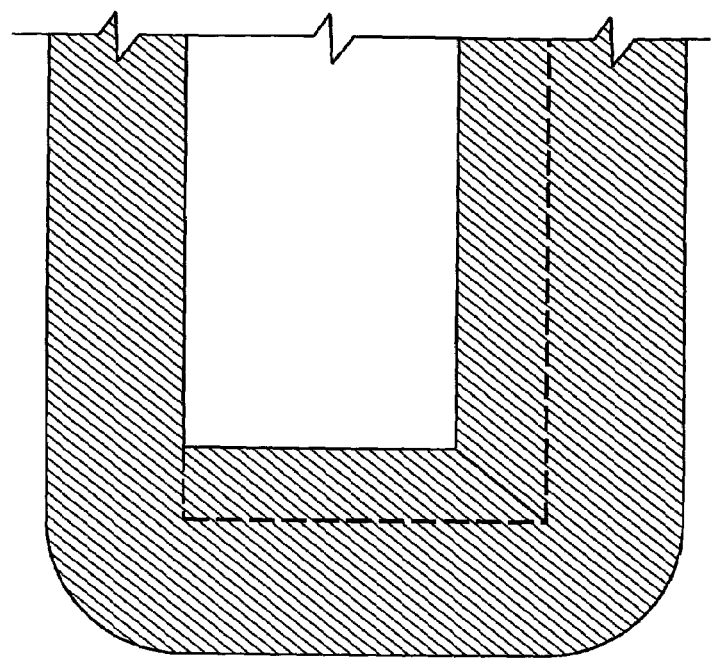
FIG. 3 is a perspective view of a stretch laminate flashing material positioned into an opening.

The stretchable flashing material is used to install the window so that the bottom corners of the rough opening are covered in a seamless, three-dimensional manner and a path for draining incidental water is provided. A procedure for installing the stretchable flashing where the building framing and/or sheathing has been previously covered with a weather resistive barrier, such as Tyvek® HomeWrap™ is as follows:

1. Cut the Tyvek® in a modified "I" pattern at the window opening.
2. Fold the flaps into the rough window opening. Fasten the flaps and trim the excess Tyvek®.
3. Cut Tyvek® at an angle at the top corners of the opening thereby forming a flap.
4. Fold the flap upwards.
5. Cut a piece of the laminate the width of the rough opening plus 12 inches (30 cm).
6. Remove first half of the release paper and stick the laminate to the bottom inside of the opening. The laminate should extend at least about 6" (15 cm) up each vertical side of the opening.
7. Remove the second half of the release paper and fold the laminate out over the Tyvek® on the sheathing face.
8. Adhere the laminate to the Tyvek® and the laminate should fit smoothly and conformably into the opening. The steps to this point are represented in FIG. 3.
9. Install the window and caulk the top and sides of the flange, but don't caulk the sill to allow drainage of water away from the building.
10. Adhere strips of the laminate to the jambs, covering the window flange.
11. Adhere strip of the laminate to head, covering the window flange.
12. Fold down the Tyvek® flap (3., above) over the head flashing and tape.

The steps of this procedure are not meant to be of a limiting nature and it is expected that those of ordinary skill in construction arts would perform the installation that would be encompassed by this disclosure. Alternatively, a similar procedure can be performed before the weather resistive barrier cover is applied to the outside surface of the building. Similarly, it is recognized that other coverings for building sheathing besides Tyvek® can be used with this invention.

The stretch-recoverable flashing material of the invention is easier to install than conventional flashing materials because it does not require precise cutting of individual lengths for different window dimensions. Because it is stretchable, a single length can be used to fit a range of window dimensions. The peel and stick feature of the butyl rubber layer provides for minimal use of fasteners. However, if fasteners are used the butyl rubber results in a "self-sealing" flashing by sealing any open space formed around the fasteners, further improving the water hold-out. Due to the stretchable properties of the flashing, it is easier to install in non-square openings such as round or arched window openings. The flashing can be used in one continuous length, thus eliminating splices and overlaps. This provides better protection against water damage at the lower window corners which is the place where water that has infiltrated at the window opening frequently collects. The flashing provides seamless coverage of the window opening in all three dimensions (vertical and horizontal faces as well as interior faces) for better protection from water intrusion. Because of seamless protection of the bottom of the rough opening, a drainage path at the sill flange can be included in the installation and provide additional protection from moisture damage. The laminate is durable, resistant to tears, and highly resistant to weather extremes (UV and thermal).

It has also been found that thermoplastic elastomers can be useful for flashing systems. One such example of a thermoplastic elastomer is Engage® which is an ethylene octene copolymer available from DuPont Dow Elastomers. These thermoplastic elastomers can be extruded into strips and because they are self-adhesive can be used as flashing in building openings similar to the stretch laminate as depicted in FIG. 3. In order to fit well in the window opening, for example, the strip can be hinged so that one portion of the strip fits onto the sill of the opening and the hinge permits the other portion to extend downward from the opening onto the vertical face of the building sheath, with no seams needed. Because water tends to collect at the bottom corners of a generally square opening, embodiments have been developed that cover both the sill or some portion of the sill and also extend some vertical distance up the window jambs. A particular embodiment is formed from one piece of the thermoplastic elastomers and conforms to both vertical jambs and the horizontal sill. The center portion is made extensible by pleating, creping or some other method so that the flashing system is adjustable to openings that range in size and shapes.

TEST METHODS

Basis weight was determined by ASTM D-3776, which is hereby incorporated by reference, and is reported in g/m$^2$.

Sheet Thickness was determined by ASTM method D 1777-64, which is hereby incorporated by reference, and is reported in microns.

Tensile strength was determined for the non-woven layers by ASTM D 1682, Section 19, which is hereby incorporated by reference, with the following modifications. In the test, a 2.54 cm by 20.32 cm (1 inch by 8 inch) sample was clamped at opposite ends of the sample. The clamps were attached 12.7 cm (5 in) from each other on the sample. The sample was pulled steadily at a speed of 5.08 cm/min (2 in/min) until the sample broke. The force at break was recorded in Newtons/2.54 cm as the breaking tensile strength. The area under the stress-strain curve was the work to break.

Hydrostatic Head is a measure of the resistance of the sheet to penetration by liquid water under a static load. A 7×7 in (17.78×17.78 cm) sample is mounted in a SDL 18 Shirley Hydrostatic Head Tester (manufactured by Shirley Developments Limited, Stockport, England). Water is pumped against one side of a 102.6 cm$^2$ section of the sample at a rate of 60+/−3 cm/min until three areas of the sample are penetrated by the water. The measured hydrostatic pressure is measured in inches, converted to SI units and given in centimeters of water. The test generally follows AATCC-127 or IOS811.

Moisture Vapor Transmission Rate (MVTR) is determined by ASTM E398-83 (which has since been withdrawn), which is hereby incorporated by reference. MVTR is reported in g/m$^2$/24 hr. MVTR data acquired by ASTM E398-83 was collected using a Lyssy MVTR tester model L80-4000J and is identified herein as "LYSSY" data. Lyssy is based in Zurich, Switzerland. MVTR test results are highly dependent on the test method used and material type. Important variables between test methods include the water vapor pressure gradient, volume of air space between liquid and sheet sample, temperature, air flow speed over the sample and test procedure. ASTM E398-83 (the "LYSSY" method) is based on a vapor pressure "gradient" of 85% relative humidity ("wet space") vs. 15% relative humidity ("dry space"). The LYSSY method measures the moisture diffusion rate for just a few minutes and under a constant humidity delta, which measured value is then extrapolated over a 24 hour period. The LYSSY method provides a higher MVTR value than ASTM E96, Method B for a moisture permeable fabric like the barrier sheet material of the invention.

Film Secant Modulus is measured according to ASTM D882-90 and is reported in units of psi.

Delamination Strength of a non-woven sheet sample is measured using a constant rate of extension tensile testing machine such as an Instron table model tester. A 1.0 in. (2.54 cm) by 8.0 in. (20.32 cm) sample is delaminated approximately 1.25 in. (3.18 cm) by inserting a pick into the cross-section of the sample to initiate a separation and delamination by hand. The delaminated sample faces are mounted in the clamps of the tester which are set 1.0 in. (2.54 cm) apart. The tester is started and run at a cross-head speed of 5.0 in./min. (12.7 cm/min.). The computer starts picking up readings after the slack is removed in about 0.5 in. (1.27 cm) of crosshead travel. The sample is delaminated for about 6 in. (15.24 cm) during which 3000 readings are taken and averaged. The average delamination strength is given in N/cm. The test generally follows the method of ASTM D 2724-87, which is hereby incorporated by reference. The delamination strength values reported for the examples below are each based on an average of at least twelve measurements made on the sheet.

Handle-o-meter Stiffness is a measure of the resistance of a specimen from being pressed into a 10 mm slot using a 40 g pendulum. Laminate elongation was measured by marking off a distance of 5 inches (12.7 cm) in the machine direction in the middle of a 10 inch (25.4 cm) wide sample, securing the laminate at one of the marks and stretching the sample manually in the machine direction until it stretched as far as it will go without the spandex strands breaking. The stretched distance at maximum elongation is measured in centimeters ("d") and the elongation is calculated as (d−12.7)/12.7* 100.

Compaction Ratio for creped sheets was calculated as (wind-up speed/the unwind speed)*100.

Water Leakage was measured by placing a 17.78 cm×17.78 cm laminate sample on a piece of wood with blotter paper between the sample and the wood and the edges were taped. The sample was placed with the flash-spun layer facing out, away from the wood. A staple was fastened through the laminate and left in place while testing. The only place where water should leak is through the hole formed by the staple. The mounted sample was placed in a spray booth and water was sprayed on the sample from a showerhead nozzle located 10 inches (25.4 cm) from the sample at a pressure of 4.4 to 5 psi (0.31-0.35 kg/cm²) for 5 minutes. Four samples were tested at the same time in 4 different spray booths and the results were averaged. The sample and the staple were oriented vertically with respect to the floor during spraying and with the machine direction of the laminate parallel to the floor.

Shrinkage of laminates was measured by die cutting a sample of the laminate 3 inches (7.62 cm) wide and 8 inches (20.32 cm) long with the length in the machine direction. The sample was hung vertically by paper clips in a forced air oven with stagnant air (low circulation) and a 4 g weight was hung from the bottom of the sample to pull out any large folds and prevent curling. The samples were heated at 140° F. (60° C.) for 1 hour and the machine direction length re-measured after cooling to room temperature. The shrinkage was calculated as (original length−heated length)/original length*100%.

Gurley Hill Porosity is a measure of the permeability of the sheet material for gaseous materials. In particular, it is a measure of how long it takes a volume of gas to pass through an area of material wherein a certain pressure gradient exists. Gurley Hill porosity is measured in accordance with TAPPI T-460 OM-88 using a Lorentzen & Wettre Model 121D Densometer. This test measures the time required for 100 cubic centimeters of air to be pushed through a 28.7 mm diameter sample (having an area of one square inch) under a pressure of approximately 1.21 kPa (4.9 inches of water). The result is expressed in seconds that are frequently referred to as Gurley Seconds.

Crocking—Surface stability to crocking is measured by the number of cycles to failure of the surface of a sample of a spunbonded sheet when secured to the base of an AATCC crockmeter (available from Atlas Electric Devices Company, Chicago, Ill.) and rubbed with a rubber finger under controlled conditions. The crockmeter is equipped with a cycle counting device, each cycle being equivalent to one complete handle rotation which is one forward and one reverse motion of the swing bar of the crockmeter. The finger moves in a straight line along an approximately 10 cm track on the sample, with a downward force of 900 g. The finger is a 15 mm diameter, 11 mm thick piece of an Eberhard Faber 101, double beveled, Pink Pearl eraser. The piece of eraser is securely fitted in the hole of the swing bar so that it projects 3.2 to 4.8 mm from the face of the swing bar when the eraser is new. A 25 cm sample of spunbonded sheet is fixed to the base of the crockmeter with a strip of double-sided tape. The swing bar handle is turned clockwise so that the finger traverses back and forth across the surface of the sample until the sample fails at the center portion of the swing stroke, not at the ends where the finger reverses direction. Failure occurs when the surface fibers are disturbed enough to expose the softer inside, marked by severe fuzz. If failure does not occur in 25 cycles, the test is discontinued and 25 is reported.

Peel tests to measure bond strength between layers were conducted in accordance with ASTM D1876, Peel Resistance to Adhesives.

EXAMPLES

Except as otherwise noted, these examples below demonstrate formation of a gathered laminate comprising a first layer of an embossed and creped flash-spun high density polyethylene non-woven sheet, a second layer comprising a polyethylene film, and an array of spandex yarns sandwiched between the two layers with the layers being bonded using one or more adhesives. The apparatus and process described above in FIG. 2 were used in these examples.

Example 1

The first layer was prepared as follows. A lightly consolidated non-woven flash-spun polyethylene plexifilamentary film-fibril sheet having a basis weight of 1.4 oz/yd² (48 g/m²) was used as the starting substrate. This is the same sheet material that when bonded is sold by DuPont as Tyvek® spunbonded polyolefin sheet was used as the starting substrate. The process was operated with the calender nip in an open position and the embosser nip in the closed position so that the bonded sheet was bonded on only one side. The operating conditions are summarized below in Table 1. The embossing pattern was a linen pattern.

The bonded sheet was then creped at a compaction ratio of 25% using a Micro Creper comb-roll configuration machine manufactured by Micrex (Walpole, Mass.) using the method described above and the conditions shown in Table 1.

TABLE 1

| Bonding Conditions | |
|---|---|
| Line Speed | 99 m/min (325 ft/min) |
| Temperature | |
| Preheat Rolls | 113° C. (235° F.) |
| Calender Roll | 141° C. (285° F.) |
| Embosser Roll | 138° C. (281° F.) |
| Embosser Nip Pressure | 12,860 kg/linear cm |
| Creping Conditions | |
| Roll Surface | Grooved |
| Blade | Combed |
| Roll Temperature | 68° C. |
| Blade Setting | 3 |

The flash-spun layer had the physical properties shown in Table 2 after bonding and Table 3 after creping.

TABLE 2

| Tensile Strength | |
|---|---|
| Machine direction (MD) | 24.6 lb./in (4308 N/m) |
| Cross direction (CD) | 25.1 lb./in. (4396 N/m) |
| Thickness | 145 μ (5.7 mils) |
| Hydrohead | 179.6 cm (70.7 in) |
| MVTR-LYSSY | 1332 g/m²/24 hr |
| Delamination | 0.19 lb/in (0.333 N/cm) |
| Handle-o-meter | 154.6 g |

TABLE 3

| | |
|---|---|
| Crepe Amplitude | 3 mm |
| Crepe Wave length | 2.33 mm-3.33 mm |
| Hydrohead | 49.5 in. (126 cm) |
| MVTR-LYSSY | 1272 g/m²/24 hr. |
| Delamination | 1.95 lb./in. (3.42 N/cm) |
| Handle-o-meter | 96.1 g |

The second layer used to form the laminate was a black 1.5 mil (0.038 mm) cast linear low density polyethylene (LLDPE) film containing no more than about 5 wt. % carbon black obtained from EquiStar (Cincinnati, Ohio). The LLDPE polymer had a melt index of 2 g/10 min and the film had a secant modulus of 21,873 psi (150.7 MPa). One side of the film was corona treated. Water leakage measured according to the test method described above was 3.30 g/5 min.

The layers were laminated at a lamination speed of 300 ft/min (91.4 m/min) with an array of 48 strands of equally spaced XA Lycra® spandex (available from DuPont) having a linear density of 1240 decitex (1116 denier) per filament. The embossed side of the first layer and the corona-treated side of the second layer were oriented adjacent the spandex array. The individual spandex strands were equally spaced with a spacing between the outermost strands of 10.5625 inches (26.8290 cm). The Lycra® spandex array was tensioned to an elongation of 280% during the lamination. Two adhesives were applied by spraying through the Lycra® strands onto the flash spun sheet: styrene-isoprene-styrene (SIS) hot melt adhesive from Ato Findley, Inc. (Wauwatosa, Wis.) was applied using a DF2 spray head from J&M Laboratories (Dawsonville, Ga.) with an air temperature of 390° F. (199° C.) and air pressure of 10 psi (68.95 kPa) in the metering head, and another hot melt adhesive, also from Ato Findley, Inc. which was applied using a slot die applicator having a tip size of 11 inches (27.9 cm). The SIS hot melt adhesive was held in a tank at 380° F. (193° C.) and applied at an add-on of 6.0 mg/in² (0.93 mg/cm²) and the other hot melt adhesive was held in a tank at 250° F. (121° C.) and applied at an add-on of 6 g/m². The open time (time between the point at which the hot melt is sprayed through the Lycra® strands onto the Tyvek® sheet and the point at which the Tyvek® sheet, Lycra® spandex, hot melt adhesive, and polyethylene film meet in the nip rolls) was 0.43 seconds (corresponding to a distance of 13 inches (33 cm). The nip roll pressure was set at 40 psi (2.8 kg/cm²). A slitter was located at the end of the process having a width of 10 inches (25.4 cm).

The laminate had an elongation of 150%, a water leakage of 5.52 g/5 min, and a shrinkage of 14.9% after heat treatment, measured according to the methods described above.

Example 2

The first layer comprised the embossed and creped flash-spun polyethylene sheet prepared as described in Example 1 above. The second layer comprised a gray 1.5 mil (0.038 mm) cast linear low density polyethylene film which contained 1 weight percent carbon black, 44 weight percent $TiO_2$, and 10 weight percent chrome green pigments, obtained from EquiStar (Cincinnati, Ohio). The LLDPE polymer had a melt index of 2 g/10 min and a secant modulus of 22,520 psi (155.2 MPa). One side of the film was corona treated.

The layers were laminated at a lamination speed of 150 ft/min (45.7 m/min) with an array of 48 strands of equally spaced XA Lycra® spandex as described in Example 1, except that a single adhesive, SIS hot melt adhesive, was applied at an add-on of 10 mg/in² (1.55 mg/cm²) (air temperature of 400° F. (204° C.) and an air pressure of 15 psi (103.4 kPa).

The laminate had water leakage of 1.53 g/5 min, measured according to the method described above and an elongation of 140%.

A sample of the laminate was heat treated and the shrinkage measured as described above. The laminate shrank 25.8% during the heat treatment. The heat-treated laminate had an elongation of 183% and a water leakage of 2.53 g/5 min.

Example 3

The first layer comprised the embossed and creped flash-spun polyethylene sheet prepared as described in Example 1 above. The second layer comprised a 1.5 mil (0.038 mm) thick film cast from an ethylene vinyl acetate (EVA) copolymer (12.5 weight % vinyl acetate) containing no more than about 5 wt. % carbon black, obtained from Equistar (Cincinnati, Ohio) The EVA copolymer had a melt index of 2.5 g/10 min and a secant modulus of 18,660 psi (128.6 MPa). One side of the film was corona treated.

The layers were laminated at a lamination speed of 150 ft/min (45.7 m/min) with an array of 48 strands of equally spaced XA Lycra® spandex as described in Example 2. The laminate was then coated on the film side with 29 mils (0.74 mm) of a butyl rubber based sealant obtained from Myro, Inc. (Milwaukee, Wis.) using a slot die and an extrusion temperature of 200° F. (93.3° C.). After extrusion, the butyl layer was covered with a two piece release paper such that a 4 inch (10.2 cm) section across the width of the butyl could be exposed separate from the remaining 6 inch (15.24 cm) section of the butyl adhesive.

The laminate with the butyl coating had water leakage of 0.14 g/5 min, and an elongation of 117%.

Example 4

The first layer comprised a Tyvek® point bonded soft structure flash-spun high density polyethylene sheet, Style 1424AS, available from DuPont having the properties shown in Table 4.

TABLE 4

| Tensile Strength | |
|---|---|
| MD | 8.05 lb./in. (1410 N/m) |
| XD | 6.2 lb./in. (1086 N/m) |
| Thickness | 6.17 mils (157 microns) |
| Hydrohead | 103.6 cm (40.8 in) |
| MVTR-LYSSY | 1841 g/m²/24 hr |
| Delamination | 0.062 lb/in (0.109 N/cm) |
| Handle-o-meter | 58.7 g |

The second layer comprised a 1.5 mil (0.038 mm) cast linear low density polyethylene film identical to that described in Example 1. The layers were laminated at a lamination speed of 150 ft/min (45.7 m/min) with an array of 48 strands of equally spaced XA Lycra® spandex as described in Example 2, except that the distance between the outermost spandex strands was 11 inches (27.9 cm). The laminate was then coated on the film side with 29 mils (0.74 mm) of a butyl rubber based sealant as described in Example 3.

The laminate with the butyl adhesive layer had water leakage of 0.32 g/5 min.

Example 5

The first layer comprised the Tyvek® point-bonded soft structure flash-spun high density polyethylene sheet described in Example 4. The second layer comprised a 1.5 mil (0.038 mm) cast low density polyethylene film (LDPE) containing no more than about 5 wt. % carbon black, the LDPE polymer having a melt index of 1.8 g/10 min and the film having a secant modulus of 23,590 lb/in$^2$ (162.6 MPa).

The layers were laminated at a lamination speed of 150 ft/min (45.7 m/min) with an array of 48 strands of equally spaced XA Lycra® spandex as described in Example 4. The laminate was then coated on the film side with 29 mils (0.74 mm) of a butyl rubber based sealant as described in Example 3.

The laminate with the butyl adhesive layer had an elongation of 150%.

Example 6

The first layer comprised the embossed and creped flash-spun polyethylene sheet prepared as described in Example 1 above. The second layer comprised a gray 1.5 mil (0.038 mm) cast film obtained from EquiStar (Cincinnati, Ohio) which comprised 15 wt % Kraton® (available from Shell Chemical Company) and 85 wt % LDPE based on the total polymer weight. The film contained 1 weight percent carbon black, 44 weight percent TiO$_2$, and 10 weight percent chrome green pigments, based on the total weight of polymer and pigment. The LDPE polymer had a melt index of 1.8 g/10 min. One side of the film was corona treated.

The layers were laminated at a lamination speed of 150 ft/min (45.7 m/min) with an array of 48 strands of equally spaced XA Lycra® spandex as described in Example 4, except that the Lycra® spandex had a linear density of 620 decitex.

The laminate had an elongation of 23% and a shrinkage of 49% after heat treatment, measured according to the methods described above. After heat treatment, the laminate had a water leakage of 2.15 g/5 min.

Example 7

Laminates were made in 8 inch (20 cm) and 10 inch (25 cm) widths.

The first layer comprised the embossed and creped flash-spun polyethylene sheet prepared as described in Example 1 above, bonded to a 0.12-0.14 lb (0.53-0.62 N) delamination strength and creped to a compation ratio of 50%. One surface was embossed with a linen pattern and the opposite surface was embossed with a rib pattern. The flash-spun polyethyelene sheet contained additives for UV protection. The properties of the first layer after bonding are given in Table 5.

TABLE 5

| | |
|---|---|
| Basis Weight (oz/yd$^2$) | 1.39 (47.1 g/m$^2$) |
| Delamination strength (lb) | 0.13 (0.58 N) |
| Hydrohead (in) | 57.4 (146 cm) |
| Machine direction tensile strength (lb) | 11.0 (49 N) |

TABLE 5-continued

| | |
|---|---|
| Cross direction tensile strength (lb) | 12.4 (55 N) |
| Gurley Hill porosity (Gurley sec) | 35.9 |
| Crock (linen) | 24.0 |
| Crock (rib) | 24.4 |

After creping, the delamination strength of the first layer was 0.13 lb (0.58 N), and the hydrohead was 39.1 inches (99.3 cm).

The second layer comprised a 1.5 mil (0.038 mm) thick, blown, waterproof PE film which was a blend of 43.5% LLDPE and 51.5% LDPE resins, obtained from EquiStar (Cincinnati, Ohio). The film also contained 4% carbon black masterbatch and 1% UV/thermal additives masterbatch, in a polyethylene carrier from Ampacet Corporation (Terrytown, N.Y.). Both surfaces of the film were micro-embossed. One surface of the film was corona treated.

Forty-nine Lycra® spandex fiber ends, aligned in the machine direction, were precisely arrayed across the width of the first and second layers, as in Examples 1-6 the fibers extended to within ⅛ inch (0.32 cm) of the edges. A corresponding array of 61 fibers was used in the 10 inch (25 cm) wide offering. The Lycra® fiber ends used were yarn bundles of approximately 55 filaments each, having a linear density of 620 dtex. The fiber type was "XA" which has no finish added. The embossed side of the first layer and the corona treated side of the second layer were oriented adjacent the spandex array. The spandex array was tensioned to an elongation of 280% during the lamination. The laminate was bonded together by two hot melt adhesives sprayed from separate heads. The first adhesive was a polyurethane (PUR) hot melt obtained from Bostik Findley, Inc. (Middleton, Mass.), which had been fortified with UV and thermal additives. The PUR adhesive was applied in closely spaced machine direction stripes (0.030 inch (0.8 mm) stripe width on 0.150 inch (3.8 mm) centers) at a coverage of 6 grams per square meter. The second adhesive was a styrene/isoprene/styrene (SIS) quick curing hot melt obtained from Bostik Findley, Inc. The SIS adhesive was applied in a spherical array from individual heads at 10 mg/in$^2$ coverage.

The PUR of the laminate was given seven days to cure, and the laminate was heat stabilized by heating to 160° F. (71° C.). The laminate was then coated on the film side with a 25 mil (0.635 mm) thick layer of black synthetic butyl adhesive obtained from TruSeal Technologies, Inc. (Beachwood, Ohio). Butyl was applied full coverage across the 8 inch (20 cm) and 10 inch (25 cm) widths; the outer ¾ inch (1.9 cm) on each edge was 10-15% thicker. Behind the butyl backing was applied a 100 lb (440 N) weight bleached Kraft paper with a siliconized release on both surfaces. The paper was applied in two overlapping sections along the width of the laminate.

The resulting laminate had a machine direction shrinkage of 30%, 160% elongation, machine direction peel adhesion of 468 g/in.$^2$, and cross direction peel adhesion of 667 g/in.$^2$. The laminate had 5% residual shrinkage when exposed to 160° F. (71° C.) temperature after the butyl layer was applied and the laminate heat stabilized.

Figure 4:
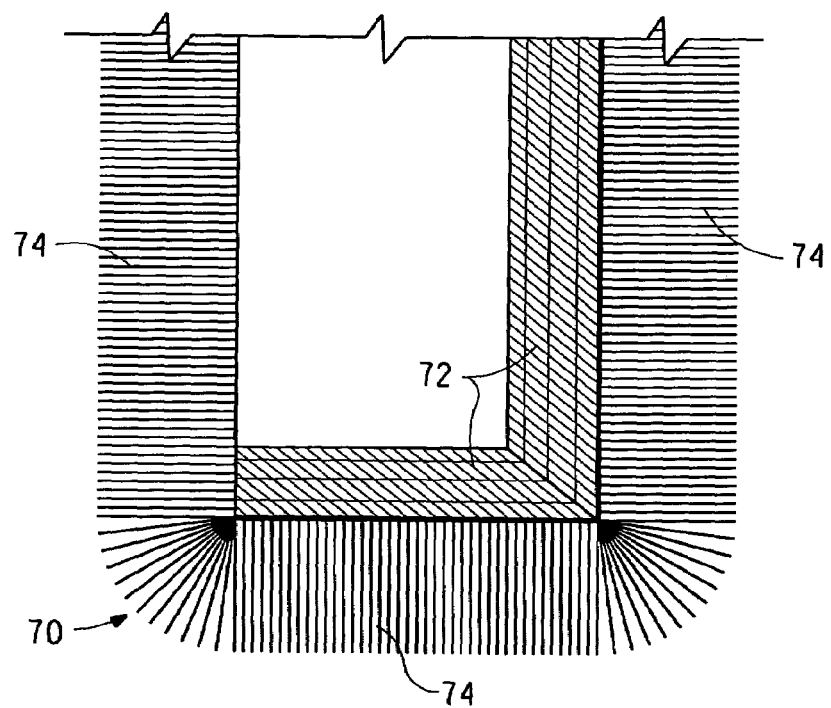
FIG. 4 is a perspective view of a pleated flashing material positioned into an opening.

In another embodiment, the flashing of the current invention comprises a stretchable pleated sheet structure which has some stretch recovery. Preferably the pleated structure is consolidated along its length for a portion of its width along one edge, as described below. The pleated structure allows the flashing to be installed in a window opening by forming a "fan" structure 70 at the corners, as shown in FIG. 4.

The pleated flashing of the current invention is obtained by pleating a water-repellant sheet. The sheet can be a non-woven layer or a non-woven sheet that has a film coating for improved resistance to water penetration. The flashing material can be breathable or non-breathable, depending on the sheet material being used. The flashing may also be comprised of multiple layers of non-woven or film-coated nonwoven sheet material. Elastomeric films can also be used, however due to their poor tear resistance, it is preferable to reinforce the films by laminating with or coating onto a nonwoven substrate. Laminates comprising a film layer and a nonwoven layer provide good strength and tear resistance due to the nonwoven reinforcement, with the film layer providing a water and vapor barrier as well as surfactant resistance. Examples of polymers suitable as the film layer are ethylene copolymers, such as Affinity® (available from Dow Chemical Company, Midland, Mich.) and Engage® polyethylene copolymers (available from DuPont Dow Elastomers, Wilmington, Del.) and Kraton® SBS (styrene-butadiene-styrene) or SEBS (styrene-ethylene-butadiene-styrene) copolymers (available from Shell Chemical Co.). The film layer should be formulated to have good ultraviolet and thermal stability with minimum expansion or contraction when cycled between temperatures of about −50° F. (−46° C.) and 185° F. (85° C.).

The pleated flashing can also include a layer of pressure sensitive adhesive applied on all or part of one of the flashing surfaces. The same pressure sensitive adhesives described above for the stretchable laminates can be used for the pleated flashing materials. Generally the pressure-sensitive adhesive is applied to the sheet before the pleating step.

Methods for pleating sheet materials are well known in the art. The pleating process is similar to that described above for creping. The sheet passes through a nip created between a heated metal roll and a comb arrangement of metal blades which push the fabric against the metal roll. The metal roll rotates in a synchronized movement and entrains the product in the machine. The blades are flexible and allow the accumulation of the pleated material. The sheet layer is generally heated during the pleating process. When the base material being pleated is a Tyvek® flash-spun polyethylene sheet, a temperature of about 220° F. (104° C.) was found to give good results. At temperatures much below 220° F. (104° C.), poor pleats with low memory are obtained. Cover sheets of release paper may be used on each side of the non-woven sheet to prevent the sheet from melting and adhering adjacent pleats to each other.

Figure 5:
FIG. 5 is a schematic side view of a crystal pleat structure.
Figure 6A:
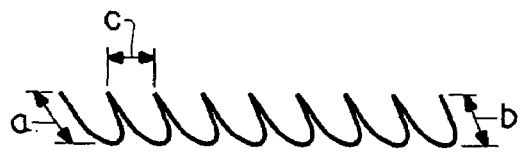
FIGS. 6a and 6b are schematic side views of French accordion pleat structures.
Figure 6B:
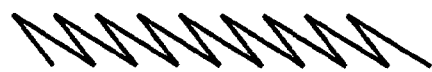
Figure 7A:
FIGS. 7a and 7b are schematic side views of regular accordion pleat structures.
Figure 7B:
Figure 8A:
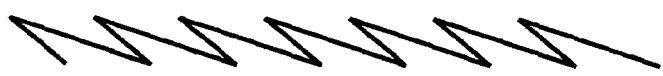
FIG. 8a is a schematic side view of a flattened pleat structure.
Figure 8B:

A number of types of pleats are known in the art. Examples of pleated structures useful in the current invention are shown in FIGS. 5-9c. FIG. 5 shows a crystal pleat structure. In the crystal pleat structure, the pleats are inclined by 45 degrees. Length a is larger than length b and the distance between the pleats varies as a function of the thickness and the type of sheet being pleated. FIGS. 6a and 6b shows a French accordian pleat structure. In the French accordion pleat structure, the pleats are inclined in the range of about 15 to 75 degrees such that adjacent pleats overlap each other. Length a is greater than the length of b. The distance c varies between ¼ inch (0.64 cm) and 2 inches (5.08 cm). FIGS. 7a and 7b show regular accordion pleats. Regular accordion pleats are symmetric "V"-shaped pleats with lengths a and b being equal and varying between ⅜ inch (0.95 cm) to 2 inch (5.08 cm). The "show" of a pleated structure is the distance measured between lines of successive pleats when the pleated material is flattened out such that the angle is close to zero. FIG. 8b is the top view of the pleat of FIG. 8a. The show is the distance between the vertical lines in FIG. 8b. The accumulation ratio is defined as the length of material going into the pleating machine divided by the length of the pleated material. Typical accumulation ratios vary from 3:1 to 6:1. In the current invention, very low pleat height and high accumulation ratio are preferred. In structures such as the French accordion pleat where the pleats overlap, the thickness of the flashing material is increased due to the overlap which provides a "gasket effect" under the window flange when the flashing is installed before the window is installed. In order to achieve a good "fan effect" at the corners using a crystal pleat structure and a film-coated nonwoven layer, the base sheet is preferably finely creped before pleating. In this case, a crepe compaction of at least 50% is preferred. Creping with 50% compaction followed by ¼ inch (0.64 cm) crystal pleating has been found to give 100% elongation when using film-coated flash-spun non-woven layers as the base sheet. When the base sheet is creped prior to pleating, the pressure-sensitive adhesive layer is generally applied after creping and before pleating.

Figure 9A:
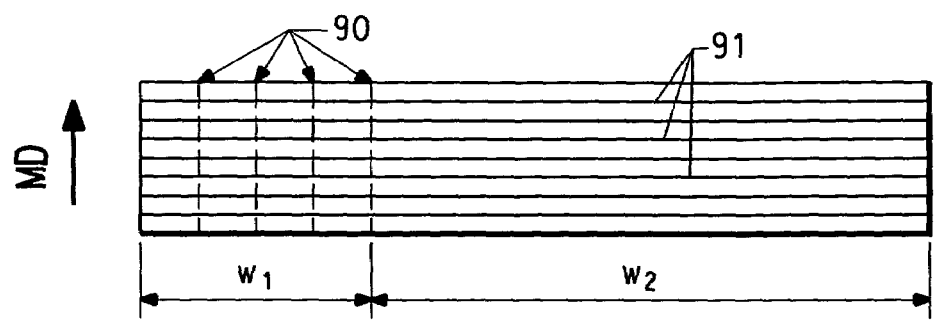
FIGS. 9a and 9b are schematic top views of consolidated pleat structures.
Figure 9B:
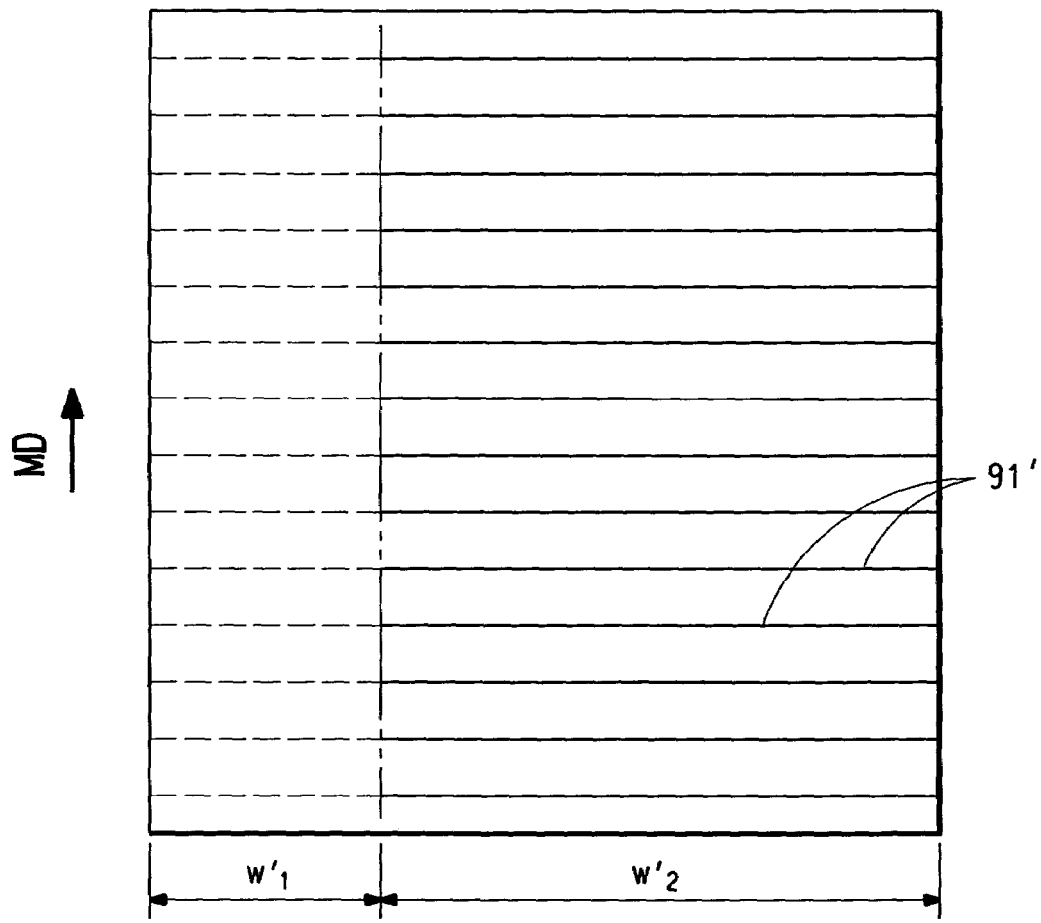
Figure 9C:
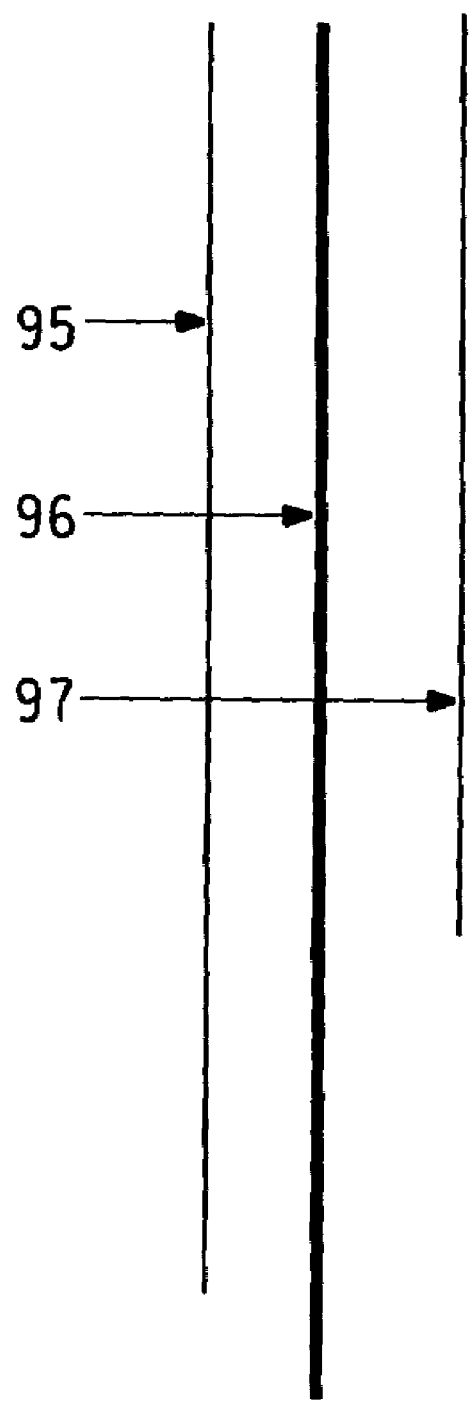
FIG. 9c is a schematic side view of the pleat structure in FIG. 9b.

One edge of the pleated flashing is preferably consolidated over a part of its width. This can be achieved by ultrasonic bonding, as shown in FIG. 9a which is a top view of a pleated sheet. In FIGS. 9a and 9b, the machine direction is indicated by MD, the lines of consecutive pleats are indicated by 91, and $w_1$ is a portion of the width of the flashing that has been ultrasonically consolidated using a non-continuous bonding pattern 90. The remaining width of the flashing, designated as $w_2$ is left unconsolidated. Pleat consolidation can also be achieved by coating the base substrate with a film layer that will melt at the temperature used in the pleating process and adhere adjacent pleats together, as shown in FIGS. 9b and 9c. FIG. 9b shows a top view of the pleated flashing material and the lines of consecutive pleats 91'. Release paper is used on the back side only of the portion of the width that is to be consolidated, $w_1$'. The portion of the sheet, $W_2$', which is to remain unconsolidated can be prevented from melting by using two layers of release paper, one on each side of the sheet during the pleating process which, on the front of the sheet, covers only the portion of the width $W_2$'. FIG. 9c is a side view of FIG. 9b which shows the full coverage release paper 95 on the bottom of the flashing substrate, flashing substrate 96, and the partial coverage release paper 97 on the top surface of the flashing substrate. The portion of the pleats that are covered by the release paper on the top and bottom don't stick together and form fan 70 (See FIG. 4) during installation. Affinity® ethylene copolymers, available from Dow Chemical Company (Midland, Mich.) has been found to provide sealing between the pleats. Affinity® 1450 copolymer with a melting point of 99° C. has been found to give good results. Alternately, the flashing can be pleated using a release paper as shown in FIGS. 9b and 9c under conditions where melting does not occur during pleating followed by activating in a separate step by heating in the presence of steam. Wherever the pleats are not protected with the release paper, the film will fuse together giving a continuous bond across the pleats. The same effect can be achieved on-line by exposing the pleated material to steam. Alternately, it is possible to use a ¼ inch (0.635 cm) adhesive tape on one or both edges of the flashing material and trimming off the tape during installation to allow it to fan out at the corners. For example, for a typical window flashing of about 10 inches (25.4 cm) width, the unconsolidated portion ($W_2$, $W_2$') of the flashing is about 6 inches (15.2 cm) and the consolidated portion ($W_1$, $W_1$') is about 4 inches (10.2 cm). As shown in FIG. 4, the consolidated portion 72 of the flashing is installed inside the window opening on the sill and jambs, and prevents the flashing from stretching too much during installation and from forming buckles, etc. In addition, the consolidation of the pleats reduces the ability of water to penetrate between the pleats. The unconsolidated portion 74 extends outside the window opening and is folded down parallel to the outer wall surface, forming a "fan" structure 70 at the corners. FIG. 4 shows the flashing installed in the bottom part of the window. It can be similarly installed in the rest of the window by continuing up the jambs with the flashing to form two additional fan structures at the upper window corners.

Good formation of small pleats has been achieved with 1.2 oz/yd$^2$ (40.7 g/m$^2$) soft structure Tyvek®D flash-spun polyethylene sheet that has been coated on both sides with Affinity® 1450 ethylene copolymer (available from Dow Chemical Co., Midland, Mich.) in a French accordion pleat. It has been found that double-side coated Tyvek® soft structure flash-spun sheet gives better pleat formation than one-side coated sheets.

What is claimed is:

1. A method of installing flashing material in an opening for receiving an article, the opening defined by a structure having an inside surface and an outside surface and the opening having a substantially horizontal bottom and substantially vertical sides, the method comprising the steps of:
    a) providing a first piece of stretch recoverable flashing material of sufficient width to cover the surface of the bottom of the opening and to extend outside the opening and onto the outside face of the structure and of sufficient length that the flashing material extend up the vertical sides of the opening,
    b) placing the first flashing material in the bottom inside of the opening, with the flashing material extending up each vertical side of the opening,
    c) extending the flashing material outward and over the outside surface of the structure,
    d) attaching the flashing material to the inside of the opening and to the outside surface of the structure,
    e) applying a sealant around the periphery of the opening, except at the bottom, thereby providing a passageway to divert liquid,
    f) inserting the article into the opening,
    g) placing a second piece and third piece of flashing material on the outside surface of the structure along the periphery of each of the vertical sides of the opening, such that they overlap with the portion of the first piece of the flashing that extends vertically up the outside face of the structure,
    h) attaching the second and third pieces of flashing to the outside surface of the structure,
    i) placing a fourth piece of flashing material on the outside surface of the structure along the periphery of the top of the opening, such that it overlaps with the second and third pieces of flashing material,
    j) attaching the fourth piece of flashing material on the outside surface of the structure at the periphery of the top of the opening.

2. A method of installing flashing material in an opening for receiving an article, the opening defined by a structure having a barrier layer applied thereto and covering the opening and the structure having an inside surface and an outside surface and covering the opening having a substantially horizontal bottom and substantially vertical sides, the method comprising the steps of
    a) cutting the barrier layer in an "I" pattern at the opening, folding the flaps of the barrier layer into the opening, fastening temporarily the flaps onto the surface of the opening,
    cutting the barrier layer at an angle at the top corners of the opening thereby forming a flap,
    folding the flap upwards,
    providing a first piece of flashing material of sufficient width to cover the surface of the bottom of the opening and to extend outside the opening and onto the outside face of the structure and of sufficient length that the flashing material extend up the vertical sides of the opening,
    b) placing the first flashing material in the bottom inside of the opening, with the flashing material extending up each vertical side of the opening,
    c) extending the flashing material outward and over the outside surface of the structure,
    d) attaching the fleshing material to the inside of the opening and to the outside surface of the structure
    e) applying a sealant around the periphery of the opening, except at the bottom, thereby providing a passageway to divert liquid,
    f) inserting the article into the opening,
    g) placing a second piece and third piece of flashing material on the outside surface of the structure along the periphery of each of the vertical sides of the opening, such that they overlap with the portion of the first piece of the flashing that extends vertically up the outside face of the structure,
    h) attaching the second and third pieces of flashing to the outside surface of the structure,
    i) placing a fourth piece of flashing material on the outside surface of the structure along the periphery of the top of the opening, such that it overlaps with the second and third pieces of flashing material,
    j) attaching the fourth piece of flashing material on the outside surface of the structure at the periphery of the top of the opening.
    k) folding down the upward flap over the fourth piece of flashing material,
    l) fastening the upward flap to the fourth piece of flashing material.

3. The method of claim 1 or 2, wherein the length of the first piece of flashing material is about 12 inches (30.5 cm) longer than the width of the bottom edge of the opening.

4. The method of claim 1 or 2, wherein the first piece of flashing material extends about 6 inches (15.2 cm) up the vertical sides of the opening.

5. The method of claim 1 or 2, wherein attaching in steps d), i), or k) is selected from the group consisting of gluing, pasting, self-adhering, stapling, nailing, mechanical fastening and combinations thereof.

6. The method of claim 1 or 2, wherein steps c) and d) are performed at the same time.

7. The method of claim 1 or 2, wherein steps g) and h) are performed at the same time.

8. The method of claim 1 or 2, wherein steps i) and j) are performed at the same time.

9. The method of claim 1 or 2, wherein the top of the opening is curved and the fourth piece of flashing material has a length greater than the circumferential length of the curve, such that the fourth piece of flashing material can overlap with the second and third pieces of flashing material.

10. The method of claim 9, wherein the fourth piece of flashing material has a length about 12 inches (30.5 cm) greater than the circumferential length of the curve.

11. A method of installing flashing material in an opening for receiving an article, the opening defined by a structure having an inside surface and an outside surface comprising the steps of provning a first piece of flashing material of sufficient width to cover the surface of the bottom of the opening and to extend outside the opening and onto the outside face of the structure and of sufficient length that the flashing material extends at least about half the vertical distance of the opening, placing the first piece of flashing material into the bottom of the opening applying a sealant around the periphery of the opening, except at the bottom part, thereby providing a passageway to divert liquid, inserting the article into the opening, placing a second piece and third piece of flashing material on the outside surface of the structure along the sides of the inserted article in the opening, such that they overlap the first piece of the flashing material, attaching the second and third pieces of flashing to the outside surface of the structure, placing a fourth piece of flashing material on the outside surface of the structure along the periphery of the top of the inserted article in the opening, such that it overlaps with the second and third pieces of flashing material, attaching the fourth piece of flashing material on the outside surface of the structure at the top of the inserted article in the opening.

* * * * *